United States Patent
Sugie

(10) Patent No.: US 9,232,148 B2
(45) Date of Patent: Jan. 5, 2016

(54) IMAGE CAPTURE APPARATUS AND ZOOMING METHOD

(75) Inventor: Kazuhiko Sugie, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 13/005,283

(22) Filed: Jan. 12, 2011

(65) Prior Publication Data

US 2011/0181753 A1 Jul. 28, 2011

(30) Foreign Application Priority Data

Jan. 26, 2010 (JP) ................................ 2010-014678

(51) Int. Cl.
- *H04N 9/73* (2006.01)
- *H04N 5/262* (2006.01)
- *H04N 5/235* (2006.01)
- *H04N 5/232* (2006.01)

(52) U.S. Cl.
CPC ............. *H04N 5/235* (2013.01); *H04N 5/2357* (2013.01); *H04N 5/23296* (2013.01); *H04N 5/2353* (2013.01)

(58) Field of Classification Search
CPC .............. H04N 5/2353; H04N 5/2357; H04N 5/23296; H04N 5/235; H04N 5/3572; H04N 5/3575; H04N 5/361; H04N 5/3651; H04N 5/367; H04N 5/3742
USPC ............. 348/226.1, 240.3, 240.99, 281, 294, 348/333.01
See application file for complete search history.

(56) References Cited

U.S. PATENT DOCUMENTS

| | | | |
|---|---|---|---|
| 6,947,074 B2 | 9/2005 | Koseki et al. | |
| 7,656,436 B2 * | 2/2010 | Kinoshita et al. | 348/226.1 |
| 7,839,448 B2 * | 11/2010 | Onozawa | 348/347 |
| 2007/0046789 A1 * | 3/2007 | Kirisawa | 348/226.1 |
| 2008/0049132 A1 | 2/2008 | Suzuki | |
| 2008/0303920 A1 * | 12/2008 | Kinoshita | 348/226.1 |
| 2009/0040238 A1 * | 2/2009 | Ito et al. | 345/660 |
| 2009/0295940 A1 * | 12/2009 | Shibuno | 348/226.1 |

FOREIGN PATENT DOCUMENTS

| | | |
|---|---|---|
| CN | 1714565 A | 12/2005 |
| EP | 1566962 A1 | 8/2005 |
| JP | 2002-314868 | 10/2002 |
| JP | 2004-007402 A | 1/2004 |
| JP | 2007-060585 | 3/2007 |
| JP | 2007-174537 A | 7/2007 |
| JP | 2008-147713 A | 6/2008 |
| JP | 2009-111613 A | 5/2009 |

* cited by examiner

*Primary Examiner* — Trung Diep
(74) *Attorney, Agent, or Firm* — Cowan, Liebowitz & Latman, P.C.

(57) ABSTRACT

An image capture apparatus comprises an X-Y address scan type image sensor; a flicker detector configured to detect a flicker of a light source; a switch configured to switch the image sensor between a first state in which the image sensor is driven by a first driving method which comprises reading out a pixel signal within a range of a first angle of view and a second state in which the image sensor is driven by a second driving method which comprises reading out a pixel signal within a range of a second angle of view narrower than the first driving method; and a controller configured to control the switch so as to drive the image sensor by the first driving method while the flicker detector is detecting the flicker and to drive image sensor by the second driving method when the flicker detector has completed flicker detection.

9 Claims, 4 Drawing Sheets

IMAGE CAPTURE APPARATUS AND ZOOMING METHOD

BACKGROUND OF THE INVENTION

1. Field of the Invention

The present invention relates to an image capture apparatus and, more particularly, to an image capture apparatus for capturing a moving image.

2. Description of the Related Art

As is conventionally known, when an image capture apparatus using a CCD or CMOS sensor captures a moving image under fluorescent light connected to the commercial power supply, the brightness may vary for each frame or light/dark horizontal stripes may be generated in a frame due to blinking of the fluorescent light at the frequency of the commercial power supply. This light/dark variation is called a flicker. The flicker can be reduced by controlling the electronic shutter to a shutter speed of n/100 seconds (n is a natural number) for a 50-Hz flicker and n/120 s for a 60-Hz flicker. To obtain the shutter speed capable of reducing the flicker so as to reduce the flicker, it is necessary to obtain the frequency of the flicker. For example, Japanese Patent Laid-Open No. 2007-60585 discloses a method of integrating video signals obtained from a CMOS sensor for one or more horizontal periods and comparing the integration values of preceding and succeeding frames to detect a flicker.

Some image capture apparatuses, which have an image sensor capable of reading out a specific region, have a function of reading out a region smaller than the entire region of the image sensor, thereby performing zooming or zooming in (i.e. magnifying) without using a zoom lens. For example, Japanese Patent Laid-Open No. 2002-314868 discloses a method of performing high-resolution zooming by changing the readout range and driving method of the image sensor.

The problem of flicker also arises when zooming is performed in this way, namely by reading out a specific region that is a sub-region of the maximum input object image receivable by the image sensor. However, the flicker can be detected using the above-described method of comparing the integration values of preceding and succeeding frames.

The prior art disclosed in the patent references above assume that the composition of the image being recorded does not change during flicker detection. If the composition does change significantly, flicker detection may be impossible. In particular, upon zooming in by reading out a specific (sub-)region, the composition often changes because of the influence of a camera shake, and accurate flicker detection may be impossible.

SUMMARY OF THE INVENTION

It is desirable to solve the above problem and to allow the accurate detection of a flicker even upon zooming.

According to the first aspect of the present invention, there is provided an image capture apparatus comprising: an X-Y address scan type image sensor configured to convert an object image formed by an imaging lens into an electric signal; a flicker detector configured to detect a flicker of a light source that illuminates an object to be imaged by the image capture apparatus; a switch configured to switch the image sensor between a first state in which the image sensor is driven by a first driving method which comprises reading out a pixel signal within a range of a first angle of view at which the image sensor captures an image and a second state in which the image sensor is driven by a second driving method which comprises reading out a pixel signal within a range of a second angle of view that is narrower than in the first driving method; and a controller configured to control the switch so as to drive the image sensor by the first driving method while the flicker detector is detecting the flicker and to drive the image sensor by the second driving method when the flicker detector has completed flicker detection.

According to the second aspect of the present invention, there is provided a method of zooming an image to be captured by an image capture apparatus while performing flicker detection, the method comprising: designating a first readout region for flicker detection; performing flicker detection; zooming in to a second readout region that has a viewing angle smaller than the first readout region; and displaying an image of the second readout region.

Further features of the present invention will become apparent from the following description of exemplary embodiments with reference to the attached drawings.

DESCRIPTION OF THE EMBODIMENTS

Figure 1:
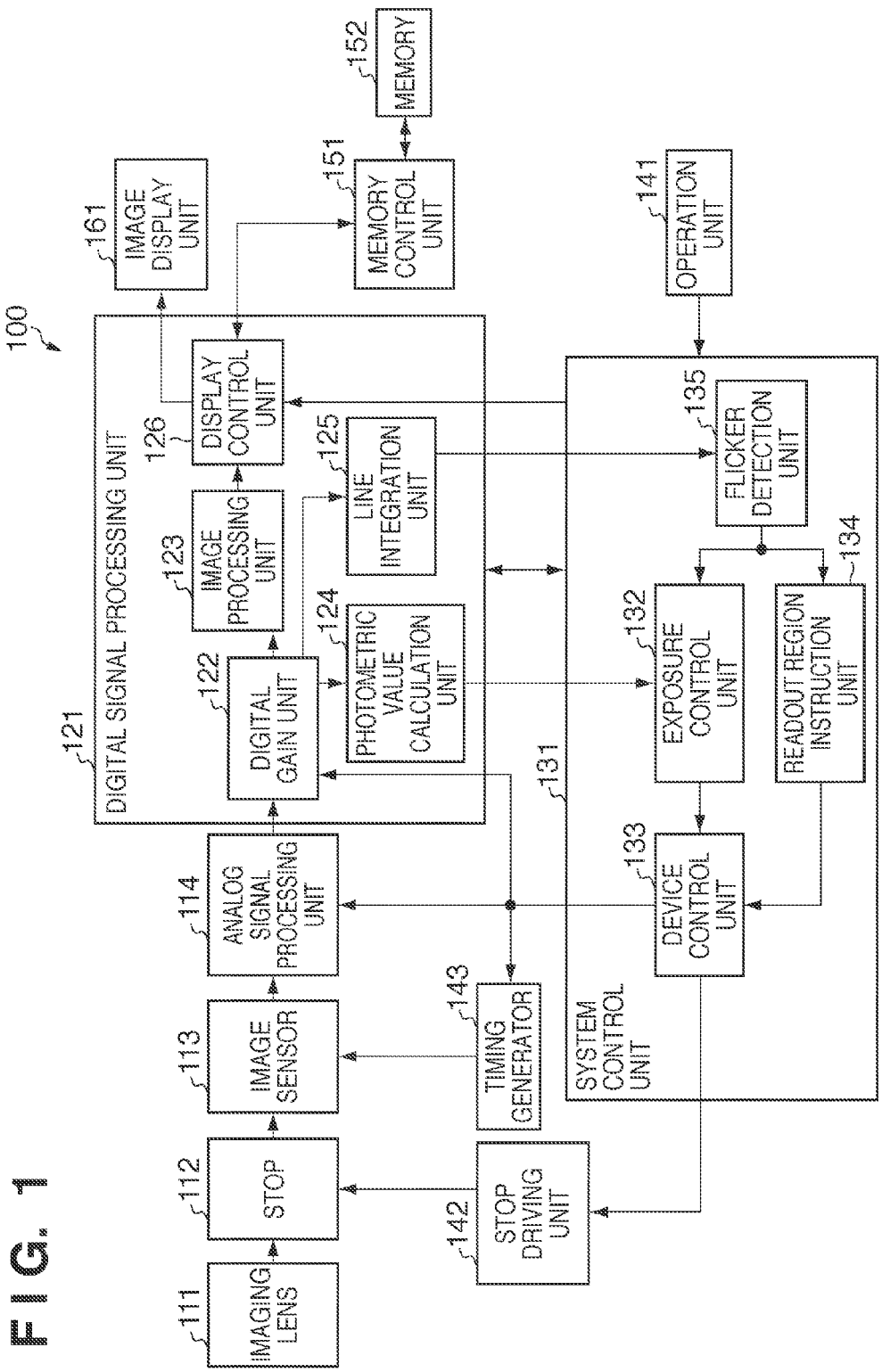
FIG. 1 is a block diagram showing the arrangement of an image capture apparatus according to an embodiment of the present invention.

FIG. 1 is a block diagram showing the arrangement of an image capture apparatus according to an embodiment of the present invention. An image capture apparatus 100 according to the embodiment of the present invention will be described with reference to FIG. 1.

Referring to FIG. 1, a light beam that has entered an imaging lens 111 forms an optical image on an image sensor 113 via a stop 112. The stop 112 is driven based on a signal output from a stop driving unit 142. The stop driving unit 142 outputs a stop driving amount to the stop 112 under the control of a device control unit 133 in a system control unit 131.

The image sensor 113 is, for example, an X-Y address scan type CMOS sensor which is driven based on a timing signal output from a timing generator 143 so as to photoelectrically convert an object image into an analog electric signal. The timing generator 143 outputs the timing signal for controlling the electronic shutter to the image sensor 113 upon receiving an instruction from the device control unit 133. The timing generator 143 also outputs, to the image sensor 113, a readout start position and end position designated by the device control unit 133.

Upon zooming by reading out a specific region out of the entire region of the image sensor 113, the image sensor 113 needs to have at least two driving methods. The image capture apparatus of this embodiment has a first driving method and a second driving method. The first driving method reads out pixel signals in almost the entire region (maximum angle of view) of the image sensor 113. The second driving method reads out pixel signals in a region of an angle of view narrower than in the first driving method. That is, an image read out by the second driving method is a zoomed-in (or magnified) image. Multilevel zooming may be enabled by providing a plurality of driving methods including, for example, a third driving method of reading out an angle of view narrower than in the second driving method and a fourth driving method of reading out an angle of view narrower than in the third driving method. In this way, a plurality or range of zoom or magnifying levels are possible.

Even when the number of readout pixels per unit time is limited due to restrictions on the frame rate or the output destination device, the angle of view of readout need only satisfy the following inequality:

(angle of view by first driving method)>(angle of view by second driving method).

That is, in any driving method, if the relation of the angles of view is maintained, the readout data amount can be reduced by performing readout while adding several pixels or skipping every few pixels.

An analog signal processing unit 114 samples and holds the analog signal from the image sensor 113, adds an analog gain, A/D-converts the analog signal into a digital signal, and outputs it. The analog gain addition amount is based on the input from the device control unit 133.

A digital signal processing unit 121 performs digital signal processing of the digital signal output from the analog signal processing unit 114, and stores it in a memory 152 via a memory control unit 151. The digital signal processing unit 121 also reads out, via the memory control unit 151, the digital video signal stored in the memory 152, and outputs it to an image display unit 161.

The digital signal processing unit 121 includes a digital gain unit 122, image processing unit 123, photometric value calculation unit 124, line integration unit 125, and display control unit 126. The digital gain unit 122 adds a digital gain to the digital signal, and outputs it to the image processing unit 123, photometric value calculation unit 124, and line integration unit 125. The device control unit 133 designates the digital gain amount.

The image processing unit 123 executes various kinds of digital signal processing such as pixel interpolation processing, color conversion processing, and resolution conversion processing. The photometric value calculation unit 124 calculates a photometric value by integrating digital signals output from the digital gain unit 122, and transmits the photometric value to an exposure control unit 132. The line integration unit 125 integrates image signals input from the digital gain unit in the horizontal direction, and outputs the integration result to a flicker detection unit 135.

The display control unit 126 stores the output from the image processing unit 123 in the memory 152 via the memory control unit 151. The display control unit 126 also reads out, via the memory control unit 151, the digital video signal stored in the memory 152, and outputs it to the image display unit 161. The display control unit 126 also switches the display on the image display unit 161 upon receiving a video signal display/non-display instruction from the system control unit 131.

The image display unit 161 is an image display device such as a liquid crystal display (LCD) and displays, for example, a moving image that is being captured or image capture information set by the user. An operation unit 141 includes an operation button to be used to set the zooming ratio of a captured image, and outputs a user input operation to the system control unit 131. The operation unit 141 also includes a moving image recording start instruction button, exposure correction value change operation dial, and various kinds of operation buttons.

The system control unit 131 is a microcomputer including a CPU, ROM, and RAM, and executes programs stored in the ROM. The system control unit 131 includes the exposure control unit 132, device control unit 133, readout region instruction unit 134, and flicker detection unit 135 which detects the flicker of a light source that illuminates an object.

The exposure control unit 132 determines the stop driving amount, shutter speed, analog gain amount, and digital gain amount based on the photometric value output from the photometric value calculation unit 124. If the flicker detection unit 135 indicates that flicker detection is progressing, the exposure control unit 132 does not select the shutter speed for reducing the flicker. That is, a shutter speed corresponding to neither n/100 s (where n is a natural number) nor n/120 s is output. When the flicker detection unit 135 detects a 50-Hz flicker, the exposure control unit 132 preferentially selects a shutter speed of n/100 s. Upon detecting a 60-Hz flicker, the exposure control unit 132 preferentially selects a shutter speed of n/120 s.

The readout region instruction unit 134 determines the zooming ratio of a captured image in accordance with the operation on the operation unit 141. If the flicker detection unit 135 indicates that flicker detection is progressing, the readout region instruction unit 134 designates an unzooming state, that is, the region of the image sensor 113 for the first reading method. When flicker detection of the flicker detection unit 135 has ended, the readout region instruction unit 134 determines the readout region of the image sensor 113 based on the zooming ratio preset by the operation on the operation unit 141, and outputs it to the device control unit 133.

Based on the input from the exposure control unit 132, the device control unit 133 outputs an electronic shutter control value to the timing generator 143, a stop driving amount to the stop driving unit 142, and gain amounts to the analog signal processing unit 114 and the digital gain unit 122. The device control unit 133 also designates the readout region of the image sensor 113 and the operation frame rate for the timing generator 143 based on the input from the readout region instruction unit 134. The flicker detection unit 135 analyzes the digital signal, extracts the flicker component in the signal, determines the presence/absence of a flicker and the flicker frequency, and outputs the determination result.

Figure 2:
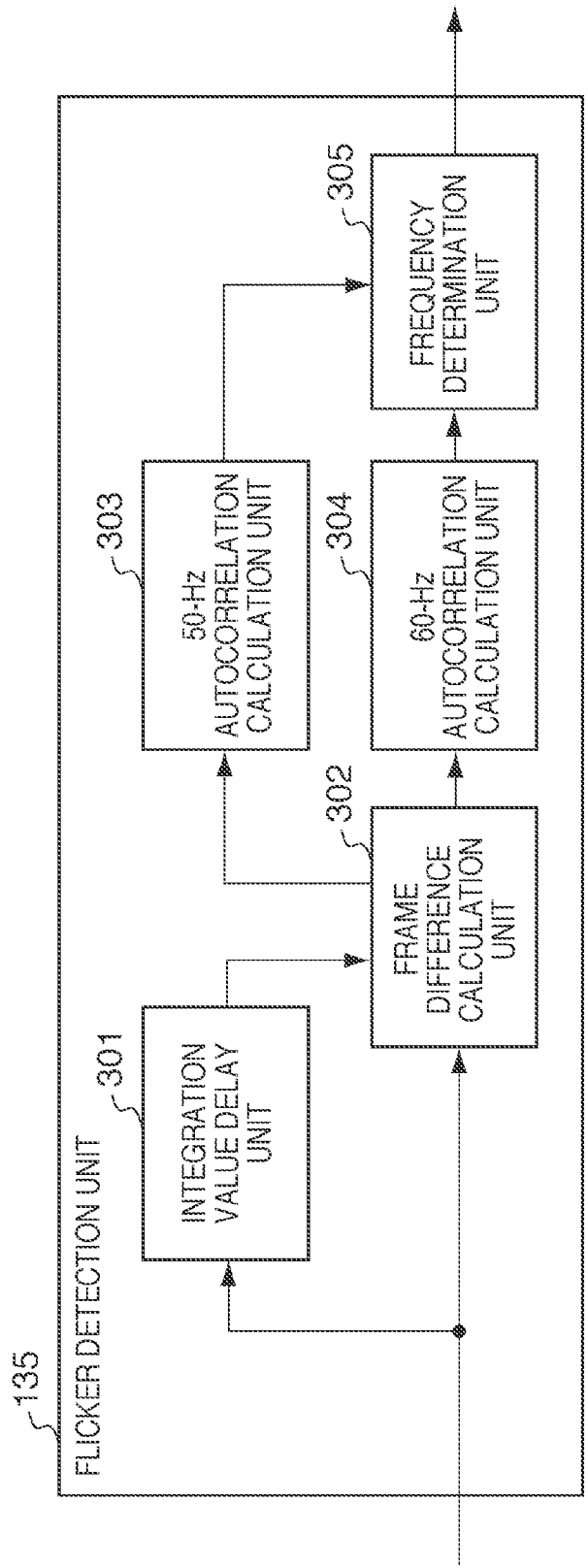
FIG. 2 is a block diagram showing the arrangement of the flicker detection unit of the image capture apparatus according to the embodiment.

The operation of the flicker detection unit 135 will be described next in detail. FIG. 2 is a block diagram showing the arrangement of the flicker detection unit 135. The flicker detection unit 135 includes an integration value delay unit 301, frame difference calculation unit 302, 50-Hz autocorrelation calculation unit 303, 60-Hz autocorrelation calculation unit 304, and frequency determination unit 305.

Figure 3A:
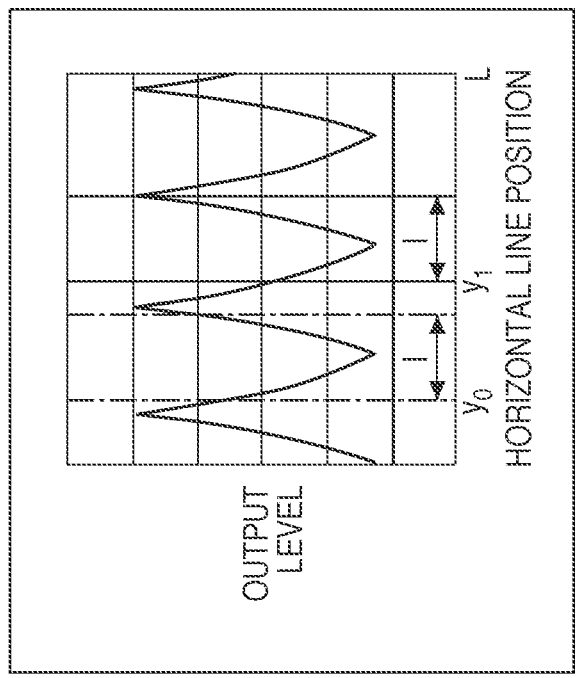
FIGS. 3A and 3B are graphs showing the outputs of a line integration unit and a frame difference calculation unit according to the embodiment.

The integration value delay unit 301 holds the integration value of an immediately preceding frame input from the line integration unit 125, and outputs the integration value of the immediately preceding frame to the frame difference calculation unit 302. FIG. 3A shows the output waveform of the line integration unit 125 when the captured object has a uniform brightness surface. Referring to FIG. 3A, N frame indicates the output waveform of the line integration unit 125, and (N−1) frame indicates the output waveform of the integration value delay unit 301.

Figure 3B:
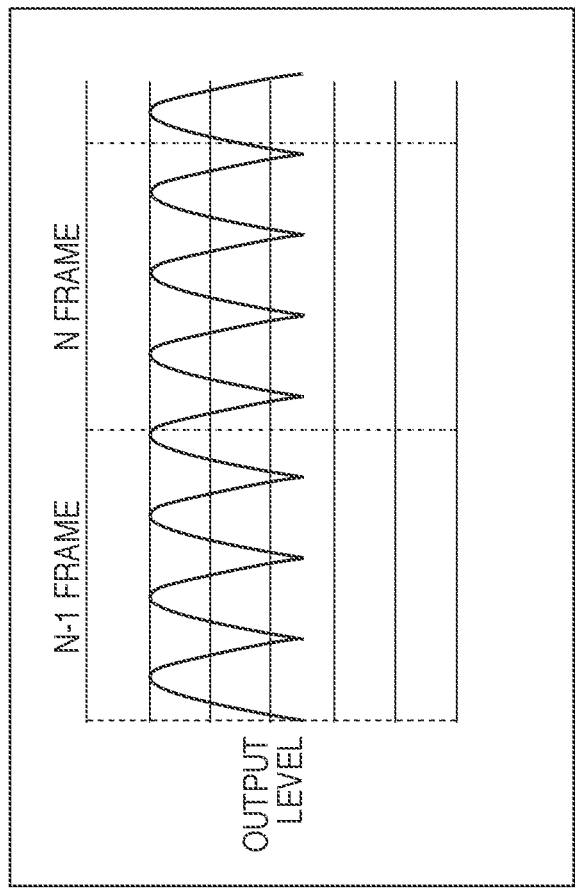

The frame difference calculation unit 302 calculates the difference between the integration value from the line integration unit 125 and that from the integration value delay unit 301, thereby removing the reflectance component of the object and extracting only the flicker component. FIG. 3B shows an example of the output waveform of the frame difference calculation unit 302.

The 50-Hz autocorrelation calculation unit 303 and the 60-Hz autocorrelation calculation unit 304 auto-correlate the flicker component input from the frame difference calculation unit 302, and output a 50-Hz flicker correlation value $R_{50Hz}$ and a 60-Hz flicker correlation value $R_{60Hz}$ to the frequency determination unit 305, respectively.

Let L be the number of horizontal lines read out from the image sensor 113 in one frame, S(y) be the line integration value at a horizontal line position y, $f_r$ be the frame rate during flicker detection, and $f_{flk}$ be the flicker frequency. A flicker correlation value $R_x$ is given by $$R_x = \sum_{k=0}^{1} [S(k+y_0) - ave_0] \times [S(k+y_1) - ave_1]/(\sigma_0 \times \sigma_1) \quad (1)$$

where y0 is an arbitrary line position, and l is the integration value acquisition section. In addition, y1, $ave_0$, $ave_1$, $\sigma_0$, and $\sigma_1$ are given by $$y_1 = Lf_r/2f_{flk} + y_0$$

$$ave_0 = \sum_{k=0}^{1} S(k+y_0)/l$$

$$ave_1 = \sum_{k=0}^{1} S(k+y_1)/l$$

$$\sigma_0 = \sum_{k=0}^{1} [S(k+y_0) - ave_0]^2$$

$$\sigma_1 = \sum_{k=0}^{1} [S(k+y_1) - ave_1]^2$$

In equation (1), the 50-Hz flicker correlation value $R_{50Hz}$ can be obtained by $f_{flk}$=50, and the 60-Hz flicker correlation value $R_{60Hz}$ can be obtained by $f_{flk}$=60.

The frequency determination unit 305 has thresholds $Th_{50Hz}$ and $Th_{60Hz}$ for the flicker evaluation values, and makes determination in the following way.

(1) When $R_{50Hz} < Th_{50Hz}$, and $R_{60Hz} < Th_{60Hz}$, it is determined that no flicker exists.

(2) When $R_{50Hz} > Th_{50Hz}$, and $R_{60Hz} < Th_{60Hz}$, it is determined that a 50-Hz flicker exists.

(3) When $R_{50Hz} < Th_{50Hz}$, and $R_{60Hz} > Th_{60Hz}$, it is determined that a 60-Hz flicker exists.

(4) When $R_{50Hz} > Th_{50Hz}$, and $R_{60Hz} > Th_{60Hz}$, it is determined that no flicker exists because the flicker frequency cannot be specified.

In the above-described flicker detection, the flicker frequency can be specified if a captured image corresponding to two frames exists. Repeating the above-described processing enables the increase of the reliability of flicker frequency determination. For example, if one of the results (1) to (4) is obtained continuously three times, it can be employed as the final determination result. During this time, since the flicker frequency determination result is unknown, the frequency determination unit 305 outputs that flicker detection is progressing.

Figure 4:
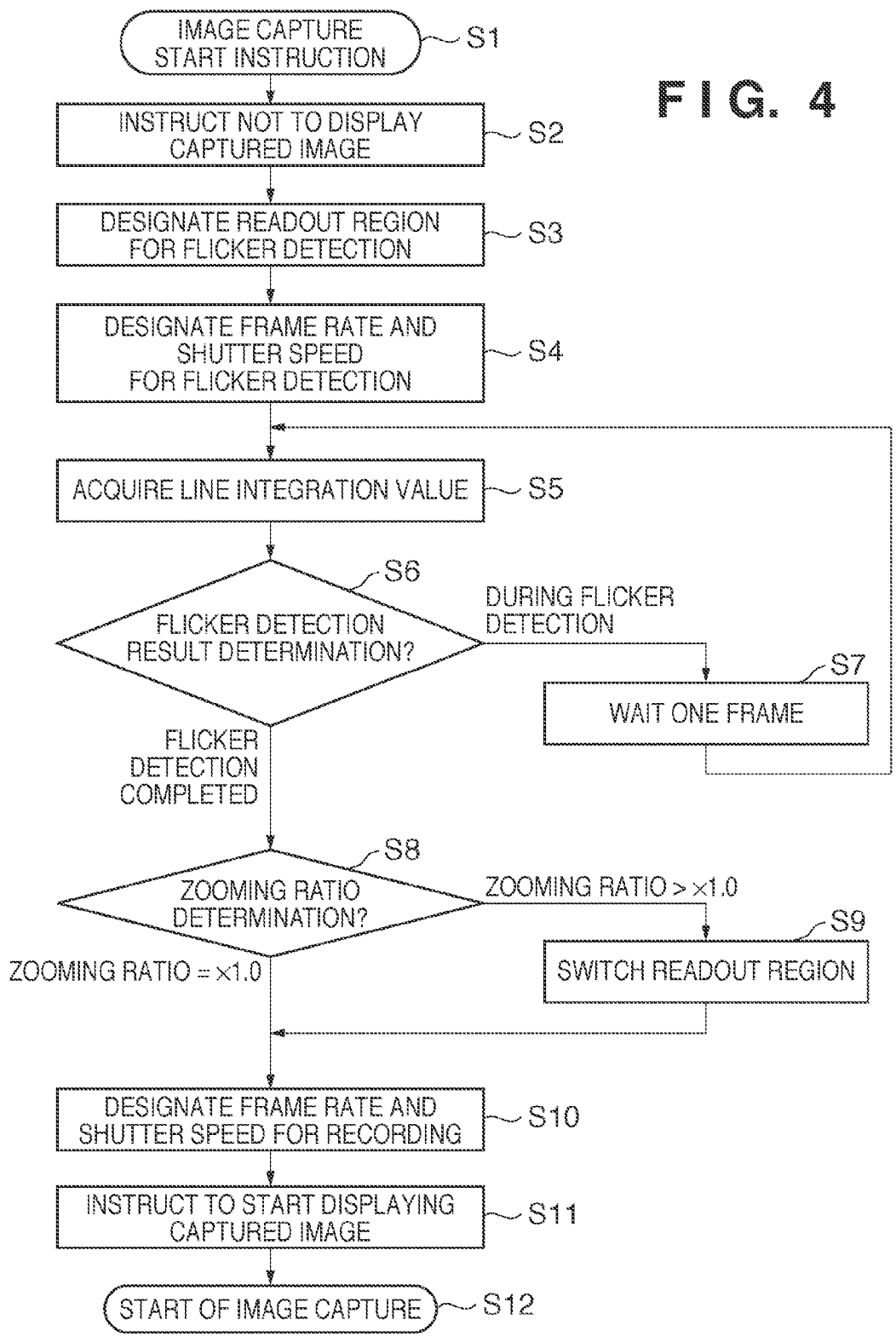
FIG. 4 is a flowchart illustrating the operation of the system control unit of the image capture apparatus according to the embodiment.

The operation of the system control unit 131 will be described next. FIG. 4 is a flowchart illustrating the operation of the system control unit 131.

The system control unit 131 starts moving image recording control upon receiving a button operation on the operation unit 141 (S1). First, to prohibit display of the captured image during flicker detection, the system control unit 131 instructs the display control unit 126 not to display the captured image (S2).

Next, the readout region instruction unit 134 notifies the device control unit 133 of a readout region corresponding to the first reading method of the image sensor 113 (S3). The exposure control unit 132 notifies the device control unit 133 of a shutter speed at which a flicker is generated. When controlling the shutter speed to, for example, 1/70 s, a 50-Hz flicker or a 60-Hz flicker is generated if it exists in the environment. If the flicker light source has a low illuminance, and the shutter speed at which a flicker is generated cannot be selected, the exposure control unit 132 adjusts the stop driving amount, analog gain amount, and digital gain amount, thereby enabling adjustment to the shutter speed at which a flicker is generated.

The device control unit 133 notifies the timing generator 143 of the shutter speed input from the exposure control unit 132 and a frame rate that does not synchronize with the flicker frequencies of 50 Hz and 60 Hz (S4). If the flicker frequency synchronizes with the frame rate in the X-Y address scan type image sensor, flickers are always generated at the same line position. At this time, it is impossible to determine whether the light/dark horizontal stripes are generated by the pattern of the object or the flickers. The frame rate that synchronizes with the flicker frequency corresponds to m/50 Hz (where m is a natural number) or m/60 Hz. For example, if the frame rate is 28 fps (frames per second), it does not synchronize with the flicker frequency.

When flicker detection control starts, the flicker detection unit 135 acquires the integration result from the line integration unit 125 (S5). The flicker detection unit 135 obtains the flicker frequency from the line integration value (S6). If the flicker frequency determination result is different from the preceding determination result, the flicker detection unit 135 acquires the line integration result again (S5) after waiting one frame (S7). If the same flicker frequency determination result is obtained a predetermined number of times (for example, three times), the flicker detection unit 135 determines that the flicker detection is completed (as a result of S6).

Upon receiving a flicker detection completion notification, the readout region instruction unit 134 determines the zooming ratio for image capture and determines the readout region (S8). If the ratio determined by the readout region instruction unit 134 is ×1.0, that is, equals the angle of view during flicker detection, the device control unit 133 does not switch the readout region. If the zooming ratio determined by the readout region instruction unit 134 is larger than ×1.0, the device control unit 133 outputs the readout region to the image sensor 113 (S9).

Next, the exposure control unit 132 selects a shutter speed capable of reducing the flicker in accordance with the detected flicker frequency, and outputs it to the device control unit 133. The device control unit 133 outputs, to the timing generator, the shutter speed determined by the exposure control unit 132 and the frame rate of the captured image (S10).

Finally, the system control unit 131 instructs the display control unit 126 to start displaying the captured image (S11) so as to start moving image capture (S12).

As described above, according to the embodiment, even when zooming by reading out a specific region, the captured image is read out at a larger angle of view during execution of flicker detection. This allows the suppression of the influence of camera shake, stabilizes the flicker detection rate, and reduces the flicker.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-014678, filed Jan. 26, 2010, which is hereby incorporated by reference herein in its entirety.

What is claimed is:

1. An image capture apparatus which includes a zoom mode in which a size of an area read out from an image sensor is changed, comprising:
   a flicker detector configured to detect a flicker based on output from the image sensor;
   a displaying controller configured to be capable to display an image zoomed to the telephoto side in the zoom mode; and
   a system controller that automatically controls the displaying controller to delay zooming so that after a flicker detection processing has completed, the size of the area read out from the image sensor is changed toward telephoto side and then the image zoomed to the telephoto side is displayed.

2. The apparatus according to claim 1, wherein when the flicker detection processing is performed the image zoomed to the telephoto side is not displayed.

3. The apparatus according to claim 1, wherein the flicker detector detects a flicker of a light source that illuminates an object to be imaged by a image capture apparatus.

4. The apparatus according to claim 1, further comprising, a switch configured to switch the image sensor between a first state in which the image sensor is driven by a first driving method which comprises reading out a pixel signal within a range of a first angle of view at which the image sensor captures an image and a second state in which the image sensor is driven by a second driving method which comprises reading out a pixel signal within a range of a second angle of view that is narrower than in the first driving method.

5. The apparatus according to claim 4, wherein the first angle of view is the maximum angle of view at which the image sensor can capture an image.

6. The apparatus according to claim 1, wherein the first readout region is the maximum angle of view at which an image sensor can capture an image.

7. The apparatus according to claim 1, wherein the zoom unit is arranged to control the image sensor from the state with the angle of view related to the first read out region available to one of the states with a narrower angle of view after the flicker detector has completed flicker detection.

8. The apparatus according to claim 1, wherein in the zoom mode, the image zoomed to the telephoto side is displayed after a flicker detection processing has completed.

9. The apparatus according to claim 1, wherein the flicker detector detects a flicker after a start of displaying of the captured image.

* * * * *